United States Patent [19]
Curtis

[11] Patent Number: 5,697,845
[45] Date of Patent: Dec. 16, 1997

[54] TWIN MASS FLYWHEEL SUB-ASSEMBLY FOR A MOTOR VEHICLE

[75] Inventor: Anthony John Curtis, Leamington Spa, United Kingdom

[73] Assignee: Automotive Products, plc, Leamington Spa, England

[21] Appl. No.: 331,494

[22] PCT Filed: Mar. 4, 1994

[86] PCT No.: PCT/GB94/00422

§ 371 Date: Dec. 29, 1994

§ 102(e) Date: Dec. 29, 1994

[87] PCT Pub. No.: WO94/20769

PCT Pub. Date: Sep. 15, 1994

[30] Foreign Application Priority Data

Mar. 5, 1993 [GB] United Kingdom ............... 9304578

[51] Int. Cl.[6] .................................................. F16F 15/12
[52] U.S. Cl. .................................. 464/3; 192/201; 464/68
[58] Field of Search .............................. 464/1, 3, 24, 66, 464/68, 84, 100, 101, 160; 192/201, 212; 74/574, 573 F, 567

[56] References Cited

U.S. PATENT DOCUMENTS

| | | | |
|---|---|---|---|
| 2,667,049 | 1/1954 | Guernsey et al. | 464/3 |
| 3,455,286 | 7/1969 | Reisacher et al. | 464/1 X |
| 3,884,087 | 5/1975 | Sakaki | 464/84 X |
| 4,800,996 | 1/1989 | Loizeau | 192/201 |
| 5,083,981 | 1/1992 | Förster | 464/24 |

FOREIGN PATENT DOCUMENTS

| | | |
|---|---|---|
| 2361574 | 3/1978 | France . |
| 2621371 | 4/1989 | France . |
| 4134406 | 4/1992 | Germany . |
| 2171172 | 8/1986 | United Kingdom . |
| 2198808 | 6/1988 | United Kingdom . |
| WO89/01097 | 2/1989 | WIPO . |
| 92/14076 | 8/1992 | WIPO . |

*Primary Examiner*—Daniel P. Stodola
*Assistant Examiner*—Eileen A. Dunn
*Attorney, Agent, or Firm*—Paul E. Milliken; Lee A. Germain

[57] ABSTRACT

A twin mass flywheel sub-assembly comprising a pair of axially spaced side plates for connection with an associated first flywheel mass, a force transmitting member for connection with an associated second flywheel mass and being disposed at least partially between the side plates. A plurality of linkages connect the side plates and the force transmitting member, each linkage comprising a first link pivotally connected to the side plates, a second link pivotally connected to the force transmitting member, and a pivot for pivotally connecting the first and second links. The linkages being arranged to move in a generally radially outward direction as the sub-assembly rotates thereby controlling relative rotation of the side plates and force transmitting member. One of the flywheel masses may have cushioning springs to engage the other flywheel mass at the limits of relative rotation of the flywheel masses.

21 Claims, 7 Drawing Sheets

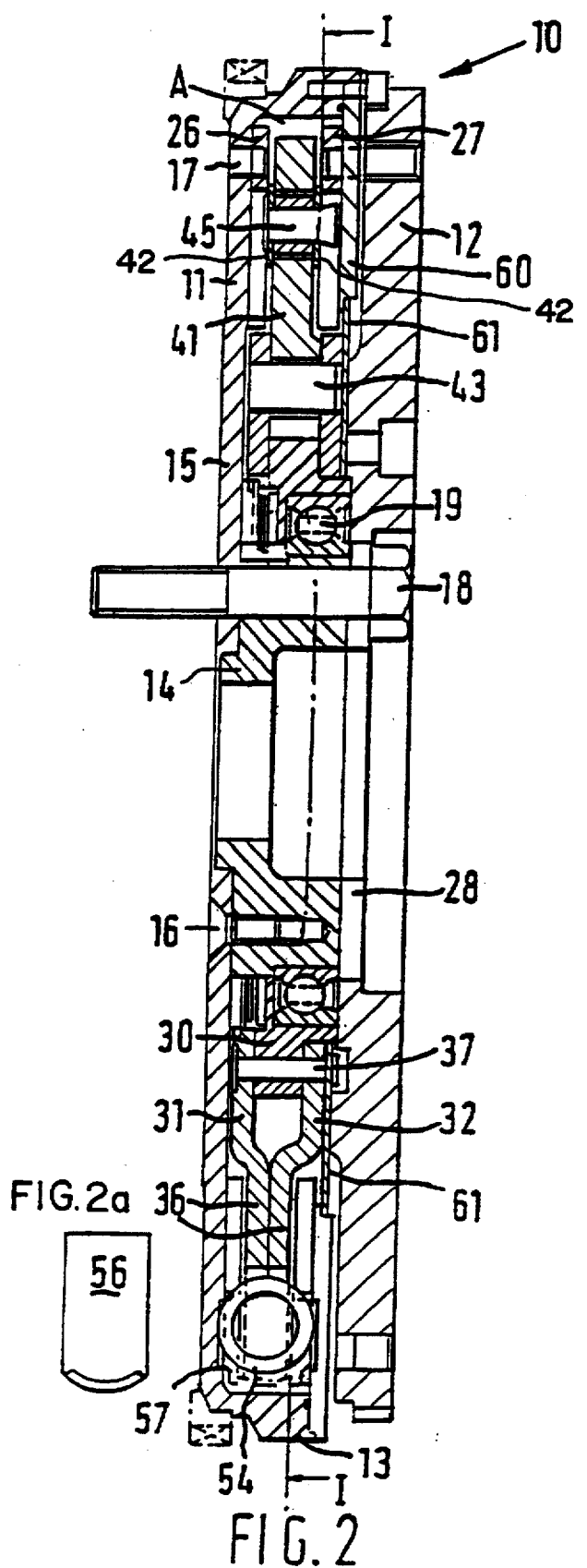
FIG. 2
FIG. 2a
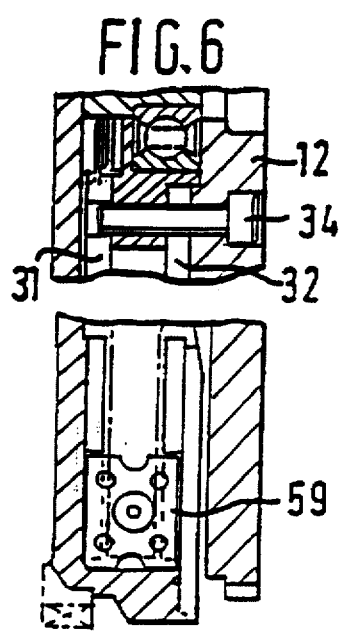
FIG. 6
FIG. 5

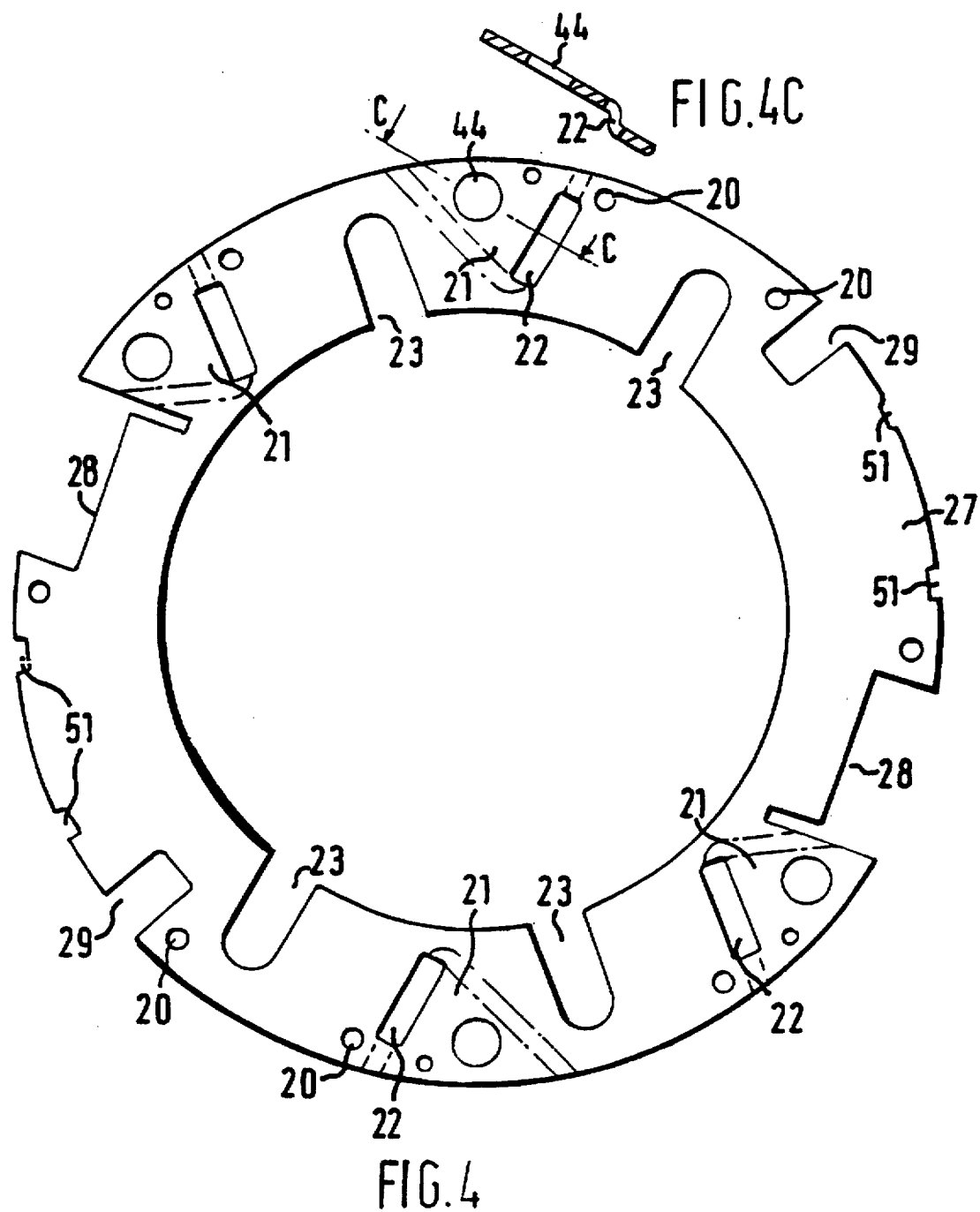

5,697,845

1

TWIN MASS FLYWHEEL SUB-ASSEMBLY FOR A MOTOR VEHICLE

The present invention relates to a twin mass flywheel arrangement for absorbing or compensating for torsional vibrations such as can arise in a vehicle transmission assembly.

More particularly, the invention relates to a twin mass flywheel of the type described in WO 89/01097 in which two coaxial flywheel masses which are mounted for limited angular rotation relative to each other; and a plurality of pivotal linkages interconnect the two flywheel masses each comprising a first link pivotally connected one of the flywheel masses, and a second link pivotally connected to the other of the flywheel masses, and means for pivotally connecting the first and second links.

A problem arises due to the pivotal linkage striking one of the flywheel masses at extremes of relative rotation, thereby causing noise. A proposal for the use of cushioning means at the limits of relative rotational movement is disclosed in WO 92/14076. The cushioning means disclosed therein have problems due to the conflicting requirements of resilience on one hand and wear resistance on the other hand.

It is an object of the present invention to provide a twin mass flywheel of the above type with improved cushioning means.

According to the invention there is provided a twin mass flywheel for a vehicle comprising two co-axially arranged flywheel masses which are mounted for limited angular rotation relative to each other; and a plurality of pivotal linkages interconnecting the two flywheel masses each linkage comprising a first link pivotally connected to one of the flywheel masses, a second link pivotally connected to the other of the flywheel masses, and a pivot for pivotally connecting the first and second links, said linkage being arranged to tend to move radially outwardly as the flywheel rotates, at least one of the flywheel masses having cushioning means thereon to engage the other flywheel mass at the limits of said relative rotation in at least one direction of relative rotational movement characterised in that the cushioning means on said one flywheel mass engages a radially outer marginal portion of the other flywheel mass.

Preferably one flywheel mass comprises a hub, a first annular plate fast with the hub and a pair of annular side plates spaced axially apart and fast with the hub, and the second flywheel mass is mounted on the hub and comprises a second annular plate with a pair of flange plates fixed thereon having portions located between the side plates, and the cushioning means act between the side plates and the flange plates at said limits.

Preferably the flange plates of the second flywheel each have a pair of diametrically opposed radially outwardly projecting arms thereon, the arms on one flange plate being aligned with arms on the other flange plate, and the cushioning means being mounted in aligned apertures in the two side plates.

Preferably the first annular plate has a cylindrical outer side wall forming an annular cavity around the hub and said side plates and flange plates are located within the cavity, and the radially outer ends of the arms engage friction damping devices fixed relative to the radially inner surface of the cylindrical wall.

Conveniently the annular cavity is closed by an annular cover plate fixed to the end of the sidewall away from the first annular plate and the cavity is filled with a viscous material for damping movements within the cavity.

2

For a better understanding of the present invention and to show more clearly how to carry it into effect reference will now be made, by way of example, to the accompanying drawings in which;

FIG. 2 is a sectional view on line II—II of FIGS. 1A and 1B;

FIG. 2a is a sectional view of one of the end caps for the springs.

FIG. 4 is a plan view of a side plate showing at FIG. 4C a sectional view on the line C—C;

FIG. 5 is a section on the line V—V of FIG. 1B;

FIG. 6 is a section on the line VI—VI of FIG. 1B;

Figure 1A:
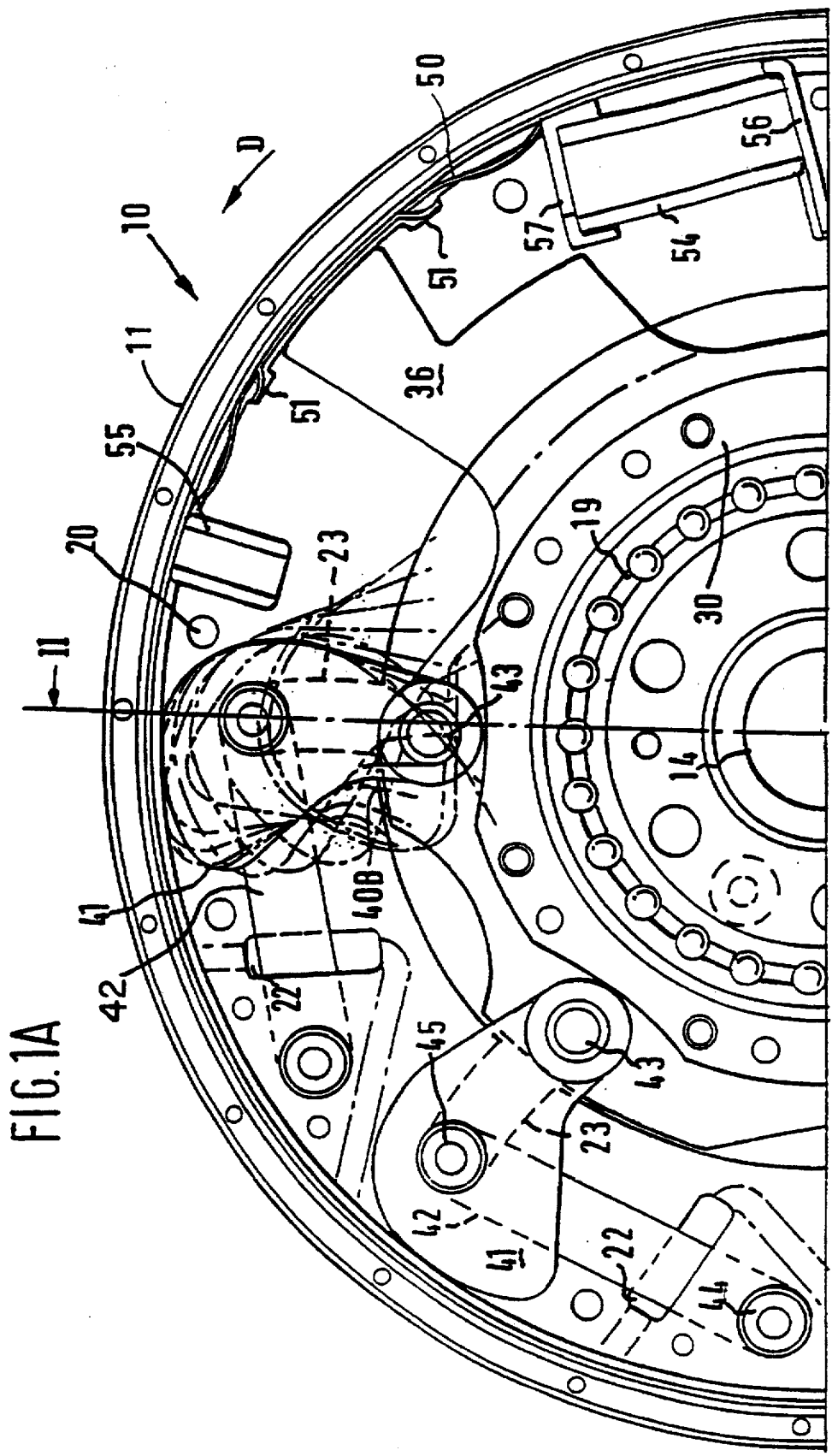
FIGS. 1A and 1B show two halves of a cross-sectional view of a twin mass flywheel according to the present invention taken along the line 1—1 in FIG. 2.

With reference to FIGS. 1 to 6 of the accompanying drawings there is illustrated a twin mass flywheel 10 comprising two flywheel masses 11 and 12. One flywheel mass 11 is fixed on a flange of a crankshaft of an internal combustion engine (not shown) by way of a central hub 14 and bolts 18. In use a friction clutch (not shown) could be secured to the second flywheel mass 12. Under normal drive conditions the flywheel masses 11, 12 rotate in a counter-clockwise direction in the view shown in FIG. 1A as indicated by the arrow D. The flywheel mass 12 is mounted on the central hub 14 via a bearing 19.

The flywheel mass 11 comprises the hub 14 which is fixed to the crankshaft and first annular plate 15 fixed to the hub 14 by the bolts 16. The first annular plate 15 is a sheet steel pressing having an outer cylindrical side wall 13.

The annular plate 15, hub 14, and outer wall 13 form an annular cavity A, the base of which is formed by the plate 15. A pair of annular sheet steel side plates 26 and 27 are located within the annular cavity A. The side plates 26 and 27 are mirror images of each other, and the side plate 27 is shown in FIG. 4 and FIG. 4C. The side plate 26 adjacent the first annular plate is fixed thereto by pegs or dowels 17 that engage holes 20 spaced around the outer periphery of each side plate.

The other side plate 27 is axially spaced from side plate 26 and the two plates 26 and 27 are held apart by circumferentially spaced axially inwardly indented areas 21 on each side plate which abut each other. The two plates 26 and 27 can be secured together by spot welding, or by screw fasteners, rivets etc. in the abutting areas.

The second flywheel mass 12 is arranged at the open end of said cavity A and is mounted rotatably to the first flywheel mass 11 by way of the bearing 19. The bearing 19 is non-rotatably mounted on the hub 14 and is secured in place between a flange 28 on the hub and the plate 15. The outer race of the bearing 19 is non-rotatably mounted by an interference fit in the centre of the second flywheel mass 12.

Figure 3:
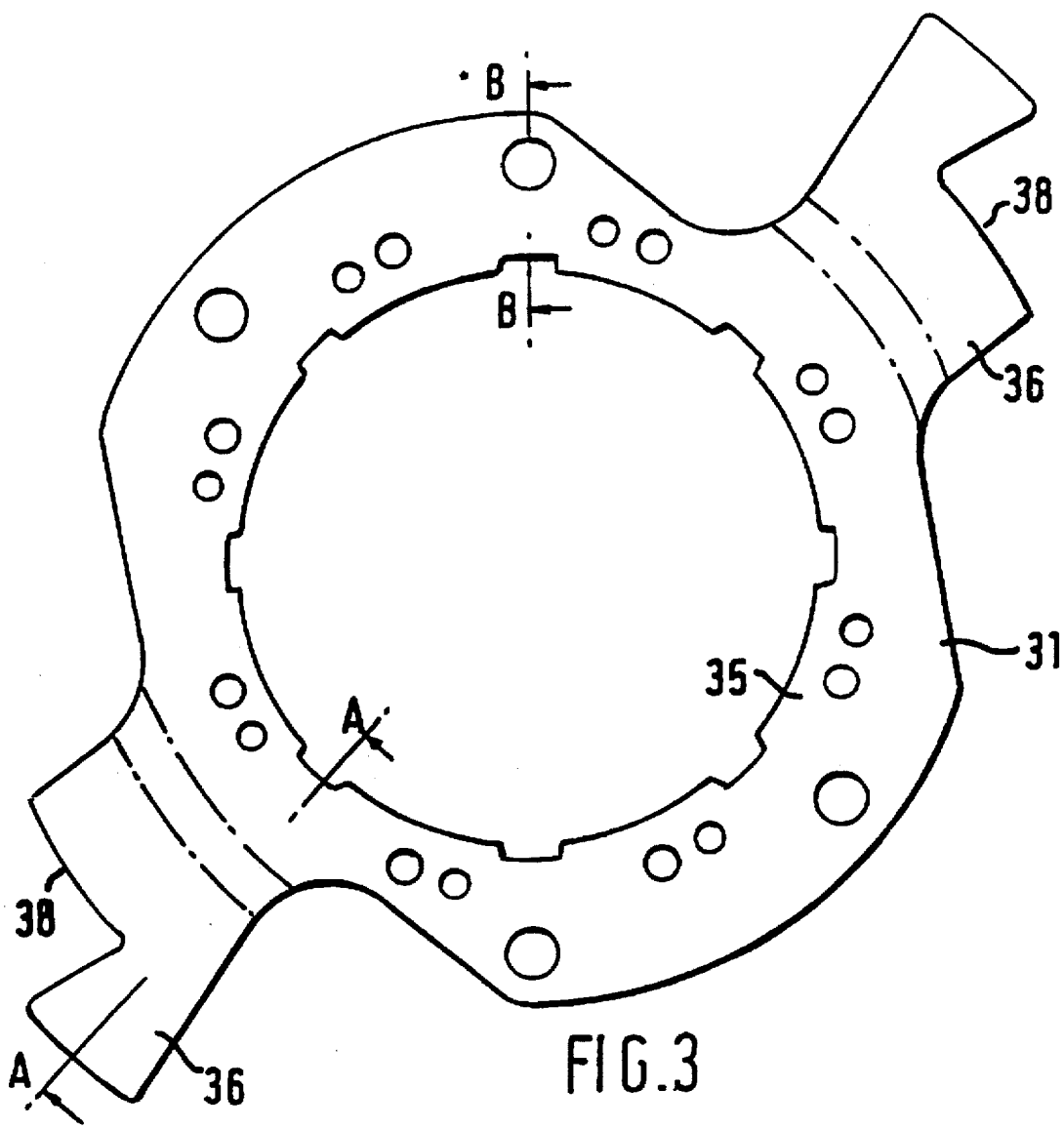
FIG. 3 is a plan view of the flange plate showing at FIG. 3A and FIG. 3B sectional views taken on the lines A—A and B—B respectively.
Figure 3A:
Figure 3B:

The second flywheel mass 12 further includes a hub part 30 and a pair of annular flange plates 31 32, the hub part 30 is secured to the flywheel mass 12 by spaced set screws 34 (see FIG. 6). The two flange plates 31 32 are mirror images of each other and one flange plate 31 is shown in FIG. 3. The two flange plates 31 and 32 each have a radially inner annular portion 35 with two diametrically opposed radially extending lugs 36 thereon which are formed axially inwardly of the annular portion so that when the two plates 31 and 32 are secured back-to-back on the hub part 30 by rivets 37 the aligned lugs 36 on each plate 31 and 32 abut.

Relative rotation between the two flywheel masses 11 and 12 is controlled by a plurality of, preferably four, pivotal linkages 40 circumferentially spaced around the flywheel masses, and by two friction damping means 50 located on the inner surface of the wall 13. Each pivotal linkage 40, only one 40A of which is described in detail, comprises a first link 41 pivotally mounted between the spaced annular portions 35 of the flange plates 31 of the second flywheel mass 12 by way of a pivot 43, and a second link 42 pivotally mounted on the side plates 26 27 of the flywheel mass 11 by way of pivot 44. The two links 41 and 42 are pivotally connected to each other by means of a third pivot 45.

Figure 1B:
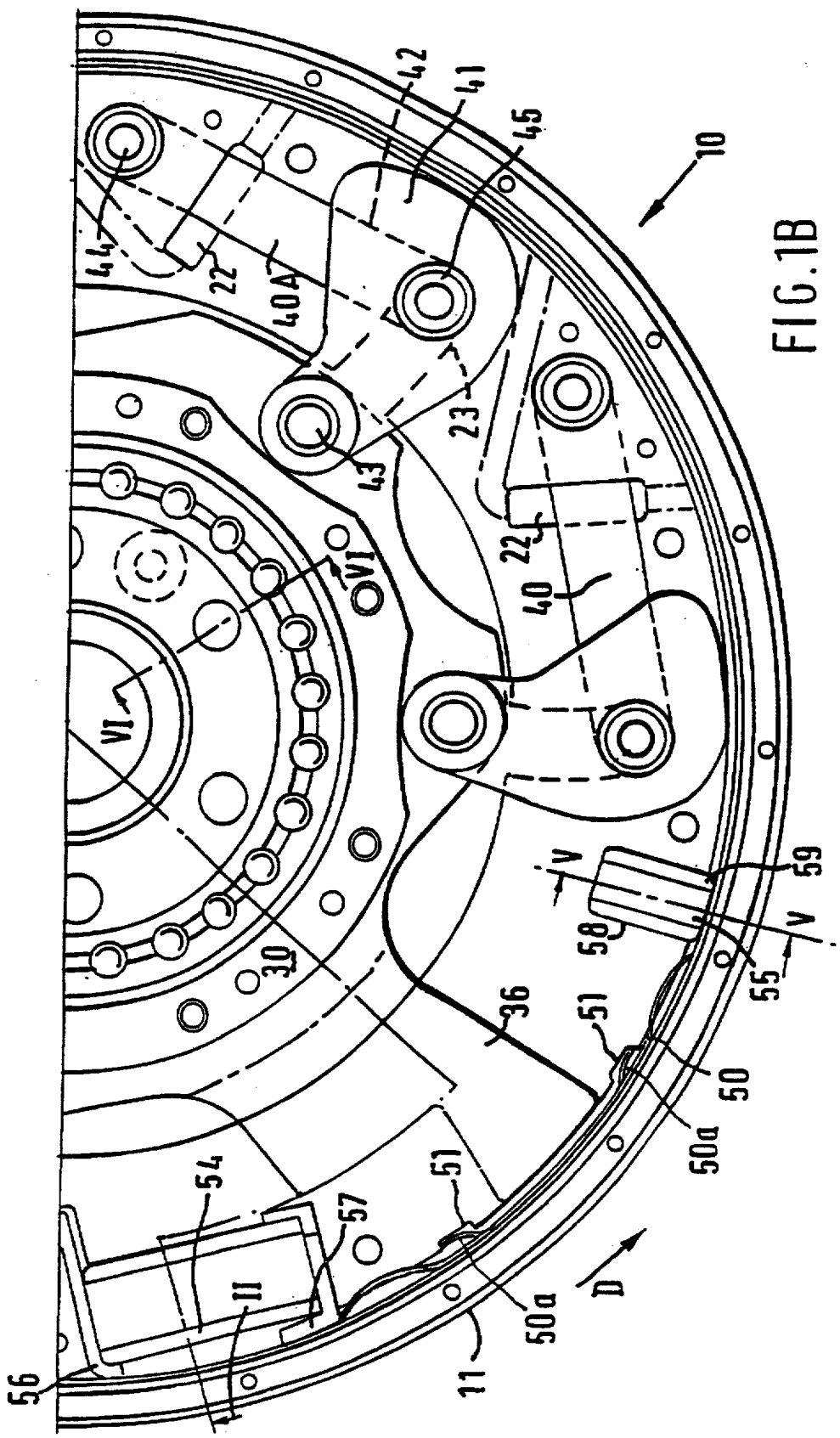

It will be noted from FIG. 1B that the pivot 43 is positioned radially inwardly of the pivots 44 and 45. The first link 41 is formed as a bob weight mass having a greater mass at its end remote from the pivot 43, and adjacent the pivot 45 between the two links 41 and 42. The link 41 also has its centre of mass off-set towards its leading edge considering the link 41 relative to its normal drive direction. By off-setting the centre of mass in this manner the centrifugal bob weight effect of the link 41 is increased in the normal drive direction of rotation D.

The second link 42 comprises a pair of parallel arms which are arranged one on each axial side of the bob weight 41. Each pair of arms 42 located one on each axial side of the bob weight 41 extend from the pivot 45 through an aperture 22 in an inclined side of a respective indented area 21 of each side plate 26 27 to connect with a pivot 44 on the axially outer side of said side plates. The side plates 26, 27 have circumferentially spaced radial slots 23 extending radially outwardly from the inner periphery thereof, to accomodate radial movement of the pivot 45.

Figure 7:
FIGS. 7 and 8 show side and plan views of a frictional damping leaf spring used in the flywheel of FIGS. 1A and 1B.
Figure 8:
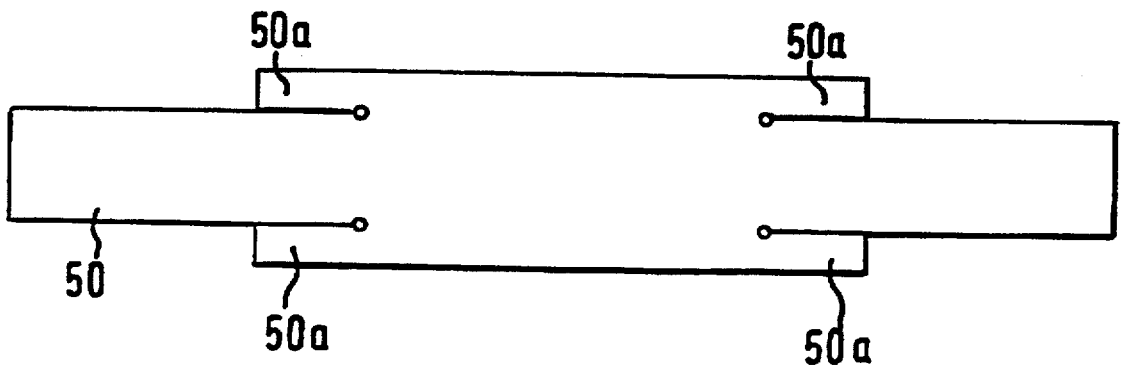

The friction damping means comprise leaf springs 50 (see FIGS. 7 & 8) fixed relative to the outer wall 13 which are deformable by the relative movement of the lugs 36 on the flange plates 31 32. As the flange plates 31 32 move relative to first annular plate 15, the radially outer edges of the lugs 36 cause the leaf springs 50 to deform and resist the movement. The springs 50 are so shaped as to provide increasing resistance with increasing relative rotational displacement between the two flywheel masses 11 and 12. The springs are held against movement relative to wall 13 by tangs 50a which engage slots 51 in side plates 26, 27.

Alternative, or additional friction damping means (not shown) could be provided by a stack of friction washers, located on the hub 14 to operate between the annular plate 15 and the hub part 30. Alternate friction washers may be driven by the hub 14 of the first flywheel mass 12, and the hub part 30 of the second flywheel mass 12. The washers may be urged together by a Belleville spring, such a friction damping means is shown in British Patent Application GB-A-2 198 808.

Resilient cushioning means 54, 55 are fixed between the side plates 26 27, to cushion the relative movement between the two flywheel masses at the limits of the angular relative rotation. The first cushioning means 54 comprise resilient stops, preferably in the form of helical compression springs, which are located on the "drive" side of the lugs 36. The springs are located in sets of aligned apertures 28 on the two side plates. One end of each spring 54 is held in an end cap 56 fixed at one end of the respective aligned set of apertures 28, and the other end of each springs 54 is located in an end cap 57 which is slideably mounted in the respective set of aligned apertures 28. At the limits of relative rotational movement, in the drive direction D, the lugs 36 will each abut said end caps 57 and thereafter such movement will be resisted by the springs 54.

The lugs 36 on the flange plates 31, 32 have notches 38 therein to accomodate a predetermined relative movement between the flywheel mass 11 and 12 before the springs 54 begin to operate.

The second cushioning means 55 each comprise resilient stops, preferably an elastomeric cylinder, held between two end caps 58 59, and which are located on the "over run" side of the lugs . The elastomeric cushioning means 55 are located between the end caps 58 59 in second sets of aligned apertures 29 on the two side plates 26, 27. At the limits of relative rotational movement of the flange plates 31 32 in the over-run direction the lugs 36 will each abut a respective end cap 58 which is slideably mounted in the respective apertures 29. Thereafter, further such movement will be resisted by the elastomeric cushioning means.

The open end of the first flywheel mass 11 is enclosed by a cover plate 60 fixed to the open end of the cylindrical wall 13. A resilient seal 61 is clamped between the second flywheel mass 12 and the flange plate 32 and engages the cover plate 60. The seal 61 is preferably a sheet metal diaphragm. The cavity 'A' may be filled with a viscous damping medium such as grease.

Operation of the twin mass flywheel shown in FIG. 1 to 6 will now he described. Under no-load conditions, with the engine rotating at high speeds centrifugal force acts on the pivotal linkages 40 and particularly on the bob weights 41 and urges the linkages in a radially outward direction. At higher rotational speeds the centrifugal force is greater and whilst this does not affect the configuration it greatly affects the force required to move the flywheel mass 12 relative to the flywheel mass 11.

If the clutch is engaging or is engaged and torque is transmitted from the engine to the flywheel mass 11 and then to flywheel mass 12 there is a tendency for the two masses to rotate relative to each other. At relatively low speeds when the influence of centrifugal force is small the flywheel masses move readily relative to each other. However at high speeds the influence of centrifugal force is much greater and relative rotation of the flywheel masses requires greater force.

The envelope of movement of the bob weights 41 is shown at 40B in FIG. 1A.

In extreme drive conditions the linkage 40 is stretched and under conditions of over-run the effects are similar except that in the embodiments described the link 42 folds under the bob weight 41.

The two resilient cushioning means 54, 55 form resilient travel end stops to prevent shock loading in extreme high torque loading conditions when the flywheel masses approach the limit of their permitted relative rotational movement. Such conditions are most likely to occur at low flywheel rotation speeds when the centrifugal controlling force of bob weights 41 is lowest.

If the cavity 'A' is filled with grease then the movement of the pivots linkages 40 between the two extremes, is damped by the grease, in that the grease provides resistance to the movement of the linkages and must flow around the bob weights 41 as they move through the respective chambers 46.

As indicated above, the bob weights 41 are assymetrically shaped having an offset mass to give different effects in the drive direction of relative rotation as compared with the overrun direction of relative rotation. The mass is off-set to the leading edge of the bob weight in the drive condition. This has the additional effect of moving the neutral position in the at-rest condition towards the overrun side of the flywheel and gives a longer drive condition travel.

Figure 9:
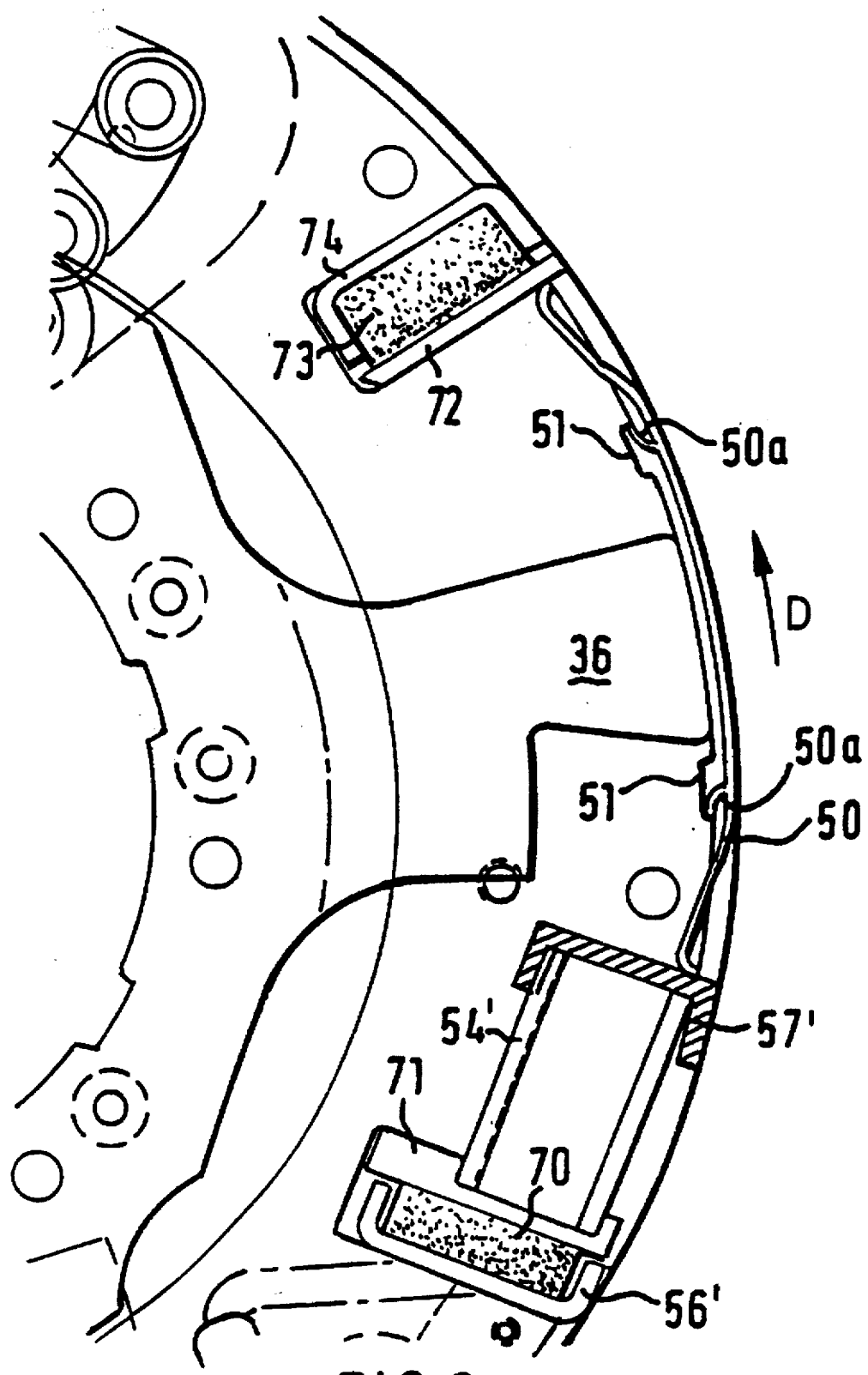
FIG. 9 shows an alternative form of cushioning means for use in the flywheel of FIGS. 1A and 1B.

FIG. 9 shows a modified form of cushioning means in which a rubber block 70 is positioned adjacent each end cap 56 in series with each spring 54'. Each spring 54' acts against a plate 71 which compresses the adjacent rubber block 70. Thus in drive direction D when lug 36 contacts end cap 57' spring 54' is compressed and moves plate 71 which also compresses block 70 until plate 71 contacts end cap 56'. The interaction of spring 54' and rubber block 70 depends on the relative spring rates of the spring and block and can be chosen to give a variety of different operating characteristics depending on the vehicle in which the flywheel is to be used.

Movement in the opposite direction is cushioned by the contact of lug 36 with a plate 72 which overlies a rubber block 73 which is supported by an end cap 74.

I claim:

1. A twin mass flywheel sub-assembly comprising a pair of axially spaced side plates for connection with an associated first flywheel mass, a force transmitting member for connection with an associated second flywheel mass and being disposed at least partially between the side plates and a plurality of linkages connected between the side plates and the force transmitting member, each linkage comprising a first link pivotally connected to the side plates, a second link pivotally connected to the force transmitting member, and a pivot for pivotally connecting the first and second links, said linkages being arranged to move in a generally radially outward direction as the sub-assembly rotates to control relative rotation of the side plates and force transmitting member.

2. A sub-assembly according to claim 1 in which the force transmitting member comprises a pair of flange plates in back to back configuration.

3. A sub assembly as claimed in claim 2 in which that the flange plates each have a pair of diametrically opposed radially outwardly projecting arms thereon, the arms on one flange plate being aligned with arms on other flange plate, and cushioning means act against these arms and are mounted in aligned apertures in the side plates.

4. A sub-assembly as claimed in claim 3 in which the cushioning means have end caps thereon at each axial end thereof, and the end caps locate in said side plates to hold the cushioning means in position.

5. A sub-assembly according to claim 1 in which a cushioning means acts between the force transmitting member and the pair of side plates to limit relative rotation therebetween in at least one direction at the limits of said relative rotation.

6. A sub-assembly according to claim 5 in which the cushioning means acts between radially outer marginal portions of the force transmitting member and side plates.

7. A sub-assembly as claimed in claim 6 in which the cushioning means comprises first cushioning means for one direction of rotation comprising compression springs, and second cushioning means for the other direction of rotation comprising elastomeric stops.

8. A sub-assembly as claimed in claim 7 in which the first cushioning means comprises compression springs and elastomeric stops in series.

9. A sub-assembly as claimed in claim 1 in which the two side plates have aligned substantially radial apertures therein to accommodate movement of a respective pivot pivotally connecting a respective first and second link.

10. A sub-assembly as claimed in claim 7 in which one link of each pivotal linkage has a greater mass than the other link so that said one link acts as a bob weight.

11. A sub-assembly as claimed in claim 10 in which the bob weight has an off-set mass.

12. A sub-assembly as claimed in claim 11 in which the off-set mass is off-set towards the leading edge of the bob weight.

13. A twin mass flywheel for a vehicle comprising first and second co-axially arranged flywheel masses which are mounted for limited angular rotation relative to each other and a sub-assembly comprising a pair of axially spaced side plates which are connected with the first flywheel mass, a force transmitting member which is connected with the second flywheel mass and is disposed at least partially between the side plates and a plurality of linkages connected between the side plates and the force transmitting member, each linkage comprising a first link pivotally connected to the side plates, a second link pivotally connected to the force transmitting member, and a pivot for pivotally connecting the first and second links, said linkages being arranged to move in a generally radially outward direction as the sub-assembly rotates thereby controlling relative rotation of the first and second flywheel masses.

14. A twin mass flywheel as claimed in claim 13 in which one flywheel mass comprises a hub, a first annular plate attached to the hub and a cylindrical outer sidewall integral with the first annular plate, and the second flywheel mass comprises a second annular plate which is mounted on the hub via a bearing.

15. A twin mass flywheel as claimed in claim 14 in which the first annular plate and cylindrical outer sidewall form an annular cavity around the hub which houses the sub-assembly, the cavity being closed by an annular cover plate fixed to the end of the sidewall away from the first annular plate and being filled with a viscous material for damping movements of the sub assembly within the cavity.

16. A twin mass flywheel as claimed in claim 15 in which a resilient sealing means acts between the cover plate and the second flywheel mass to retain the viscous material within the cavity.

17. A twin mass flywheel as claimed in claim 16 in which the sealing means comprises an annular spring steel diaphragm.

18. A twin mass flywheel as claimed in claim 14 in which cushioning means are located adjacent the outer side wall to limit the relative angular rotation in at least one direction at the limits of said relative rotation.

19. A twin mass flywheel as claimed in claim 13 in which one or more friction damping devices act between the flywheel masses to control their relative angular rotation.

20. A twin mass flywheel as claimed in claim 19 in which the friction damping devices comprises leaf springs having raised portions engageable with the force transmitting member after a predetermined relative angular rotation.

21. A twin mass flywheel for a vehicle comprising two co-axially arranged flywheel masses which are mounted for limited angular rotation relative to each other; and a plurality of pivotal linkages interconnecting the two fly wheel masses, each linkage comprising a first rigid link pivotally connected to one of the flywheel masses, a second rigid link pivotally connected to the other of the flywheel masses, and a pivot for pivotally connecting the first and second links, said linkage being arranged to move in a generally radially outward direction as the flywheel rotates, at least one of the fly wheel masses having cushioning means thereon to engage the radially outer marginal portion of the other flywheel mass at the limits of said relative rotation in at least one direction of said relative rotation.

\* \* \* \* \*